Aug. 5, 1969   G. R. HANSEN   3,458,909

VIBRATORY MOLDING APPARATUS

Filed Aug. 29, 1966

INVENTOR.
GEORGE R. HANSEN
BY
*K.W. Brownell*
ATTORNEY

United States Patent Office 3,458,909
Patented Aug. 5, 1969

3,458,909
VIBRATORY MOLDING APPARATUS
George R. Hansen, Nixon, N.J., assignor to The Carborundum Company, Niagara Falls, N.Y., a corporation of Delaware
Filed Aug. 29, 1966, Ser. No. 575,762
Int. Cl. B28b 1/08; B01f 11/00
U.S. Cl. 25—41   8 Claims

ABSTRACT OF THE DISCLOSURE

Molding apparatus, particularly for producing long, refractory shapes, comprises an elongated vertical frame, an elongated mold detachably secured to said frame, supporting means for said frame and means for permitting vertical movement of said frame relative to said supporting means, means mounted on said frame for imparting vertical vibration thereto, means for controlling horizontal vibration of said frame and a strike plate beneath said frame and adjustably engageable by a portion of said frame.

---

This invention relates to a molding apparatus and more particularly to a new and improved molding apparatus for applying vibrational energy to molds in the casting of refractory shapes.

In the field of casting ceramic ware, it has been known to employ vibratory equipment for vibrating a support base on which a mold is carried for agitating a wet moldable mixture to compact and distribute the same uniformly. Very often an electromagnetic vibrator or a pneumatically operated hammer is used to vibrate the mold for effecting lateral reciprocatory motion of said mold. Such vibratory equipment produces vibrations or reciprocatory movement in both the vertical and horizontal directions.

Although such devices have served the purposes for which they were designed, they have not been entirely satisfactory because an excess of fine particles in the mix are cast toward and against the surface of the molds and may adversely affect some of the subsequent fired properties of the cast shape. Especially in those operations where nitriding is desirable, the excessive fine particles on the surface of the cast shape will nitride first and act as a barrier in precluding proper nitriding of the inner portions of the ware. Moreover, it has been difficult to cast elongated quality shapes because vibrations effected by the above prior known devices are progressively damped upwardly as the length of the mold increases causing a premature set in some portions of the ware and nonuniform density in the finished product.

The general purpose of the present invention is to obviate the above disadvantages by providing a new and improved vibrational molding apparatus.

Accordingly, it is an object of the present invention to provide a new and improved molding apparatus.

It is another object of the present invention to provide a new and improved molding apparatus having novel means for applying vibrational energy to molds in the casting of ceramic ware.

It is still another object of the present invention to provide a new and improved molding apparatus having novel means for producing a cast body of uniform density.

It is a further object of the present invention to provide a new and improved molding apparatus having novel means for producing a cast body of homogeneous mass with less fine particle migration.

It is yet a further object of the present invention to provide a new and improved molding apparatus having novel means for producing long, thin, cylindrical refractory shapes having a uniform consistency throughout the lengths thereof.

These and other objects of the present invention will become more apparent when taken in conjunction with the following detailed description and drawings in which.

Figure 1:
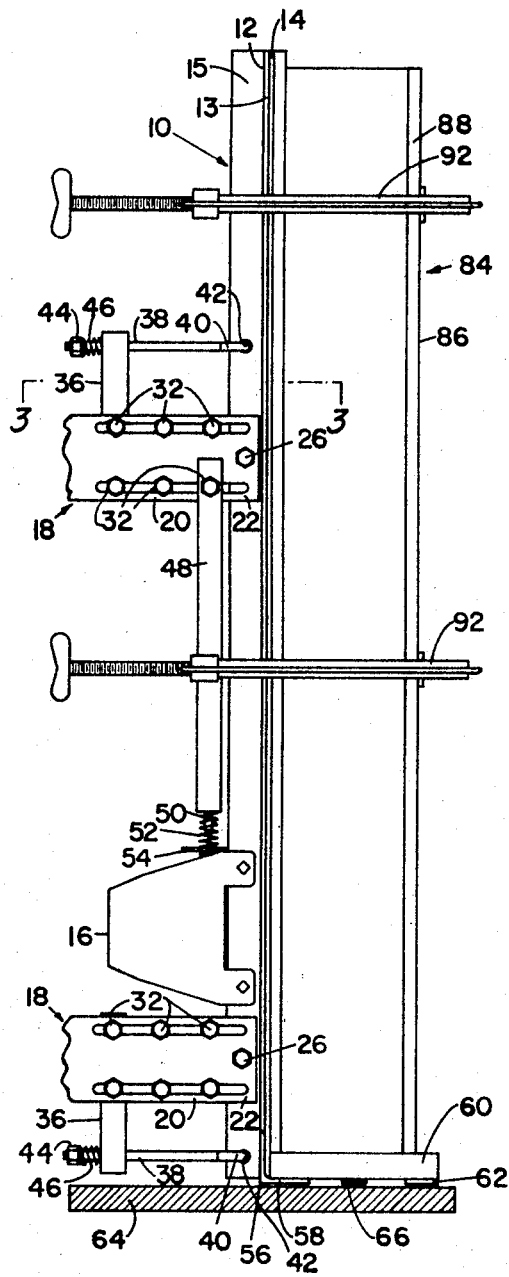
FIG. 1 is a side elevational view of the molding apparatus constructed in accordance with the principles of the present invention.
Figure 2:
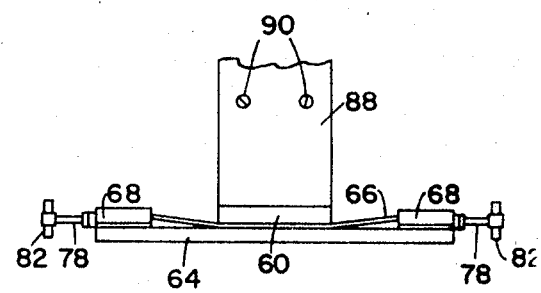
FIG. 2 is a fragmentary front elevational view of the molding apparatus of FIG. 1 with the mold and clamping means removed therefrom.
Figure 3:
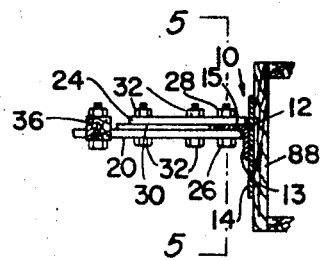
FIG. 3 is a fragmentary view, partially in section, taken on the plane of line 3—3 of FIG. 1.
Figure 4:
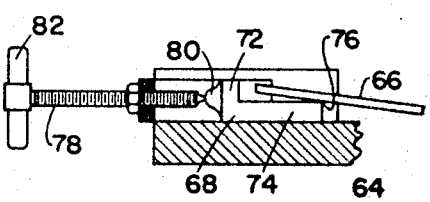
FIG. 4 is a partial, enlarged, side elevational view illustrating the adjusting means for a tension member incorporated in the present invention.
Figure 5:
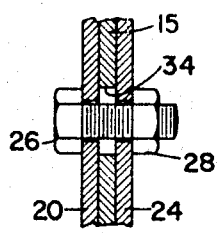
FIG. 5 is a sectional view taken on the plane of the line 5—5 of FIG. 3.

Referring to the drawings and particularly to FIG. 1, it will be observed that a molding apparatus constructed in accordance with the principles of this invention comprises an upstanding metallic support frame, generally designated 10, of a substantially T-shaped cross section (FIG. 3) and formed of an elongated angle member 12 suitably rigidly secured along the base of one leg 13 thereof to an elongated flat plate 14 as by means of welding for example. Rigidly secured onto the angle member 12 of frame 10 is an air driven vibrating unit 16 which induces vibration and transmits such vibration directly to the upstanding frame 10.

Frame 10 is supported by a pair of laterally extending support members or brackets, generally designated 18, for slight vertical movement relative thereto for a purpose to be hereinafter explained. Since the brackets are of identical construction and function in the same manner, it is believed that a detailed description of only one will suffice, it being understood that the same reference characters will be applied to identical elements.

Bracket 18 comprises an elongated metal plate 20 extending laterally from frame 10 and rigidly connected at one end to a fixed structural column or vertical shaft (not shown) and connected at the other end 22 to angle member 12. Horizontally spaced from plate 20 is a second metal plate 24 (FIG. 3) of lesser extent than plate 20, said plates being disposed on the opposite sides of the other leg 15 of angle member 12 and secured thereto by connection means comprising a suitable bolt 26 and a nut 28. A sheet metal shim or stop member 30 is secured between plates 20 and 24 by bolt and nut combinations 32 in order to maintain the proper clearance between the leg 15 of angle member 12 and plates 20 and 24 to permit relative movement therebetween. An elongated vertical slot 34 is provided in the leg 15 for accommodating the shank of bolt 26 to allow relative movement in a vertical direction between the frame 10 and bracket 18.

Since the bolt 26 and slot 34 form a loose connection, some undesirable horizontal motion is inherent during operation of the vibrating unit 16. Accordingly, means are provided for controlling and precluding such horizontal motion and said means comprises an elongated stud 36 that is rigidly secured at one end to plate 20 by any suitable means such as one or more of the bolt and nut combinations 32, for example. Stud 36 extends upwardly from bracket 18 and is provided with a bore at its other end to receive a rod 38, the rod being provided with a substantially circular shaped hook 40 which is inserted in an aperture 42 of leg 15 of angle member 12. The other end of rod 38 protrudes beyond stud 36 and is externally threaded for receiving a stop nut 44 thereon. A helical compression spring 46 is disposed about rod 38 between the stud 36 and nut 44 for exerting a pull on frame 10 and thereby urging the leg 15 of angle member 12 laterally against the end of shim or stop member 30 to control horizontal movement of the apparatus. The spring urges the angle member against the shim with just enough pressure to permit smooth vertical motion but precluding horizontal motion therebetween. Of course, the axial load on spring 46 may be adjusted by turning nut 44 in the proper direction.

Depending downwardly from bracket 18 and rigidly secured thereto as by means of a bolt and nut combination 32 is an elongated bar 48 having a pin 50 projecting axially outwardly beyond the bar. A compression spring 52 disposed about pin 50 is biased between the end of bar 48 and a plate 54 rigidly secured to the vibrating unit 16 as by means of welding. Spring 52 acts as a shock absorber in damping the vertical vibrations of the unit and is particularly desirable in the casting of relatively small shapes.

Suitably rigidly secured to the bottom of frame 10 is an angle member or base 56 having an elongated leg 58 extending beneath one side of a mold platform 60 for supporting the same. The opposite side of mold platform 60 is provided with an elongated metallic slab 62 having the same thickness as leg 58 and rigidly secured to the underside of the platform by any suitable means.

As shown in FIG. 1, a solid metal strike plate 64 is located a slight distance below the bottom surface of mold platform 60 and is adapted to be supported on a floor or ground surface. Means are provided for insuring that the amplitude of the mold unit is such that impact is attained with the strike plate 64; otherwise, the unit would tend to float in operation and produce an unsatisfactory product quality. Such means comprise an elongated metallic tension member or bar 66 disposed between strike plate 64 and the bottom surface of mold platform 60 and is supported at its opposite ends on support elements 68, respectively. Each support element is of an L-shaped configuration in side elevation and comprises a vertical leg 72 and a horizontal leg 74 supported on the strike plate 64. The free edge 76 of each horizontal leg supports one end of the tension bar 66 and acts as a fulcrum point about which the tension bar will bend.

For the purpose of adjusting the amplitude of the vertical vibration of the mold unit in accordance with the total load of the mold and the mix to be added to the mold, the fulcrum points of each support member 68 may be varied by means of an adjusting screw 78 having a swivel joint 80 at one end thereof, which in turn is connected to the vertical leg 72 of the support member 68. A hand wheel 82 is secured at the other end of screw 78 so that turning the wheel displaces the support members 68 inwardly or outwardly longitudinally of tension bar 66. Inward movement of the support members and thereby the fulcrum points increases the stiffness of bar 66 and reduces the amplitude of the vibration.

An elongated mold, generally designated 84, used in association with the present apparatus, is made of plaster or a combination of plaster and graphite. The mold is encased within a mold form 86 comprising four clamping boards 88, preferably made of wood, and fastened together by any suitable means. One of the molding boards 88 is rigidly secured to the upstanding frame 10 by means of screws 90 spaced at intervals along the length of the clamping board. A pair of longitudinally spaced C-clamp members 92 are provided to rigidly secure the mold 84 unto the face of the upstanding frame 10 for movement therewith.

Preferably, but not limited thereto, the apparatus of this invention may be employed for casting elongated thin walled tubes of a refractory material consisting of mixes that contain mullite, alumina, and some clay, if desired. These mixes are deflocculated and are thixotropic in nature when used, the moisture content being in the range of about 3 to 10 percent on a wet basis. Also, mixes containing silicon nitride bonded silicon carbide compositions may be cast by the above-described apparatus. Again, moisture content approaches about 3 to 10 percent on a wet basis with the final mix having a thixotropic nature.

It should be realized that the preceding mixes are not the only compositions that could be effectively cast with the apparatus of this invention. The principles of this invention contemplate the use of any material that can be vibration cast. Also, it should be appreciated that more or less than two brackets 18 and two C-clamp members 92 may be employed within the purview of this invention, the selection of the number of these elements depending on the length of the mold and the product to be formed.

In operation, the mold 84 is rigidly mounted on upstanding frame 10 and securely clamped thereto in order to prevent the mold from bouncing relative to the frame 10. If desired, tensioning straps or other binding means may be employed in lieu of the C-clamps. In the production of an elongated, thin-walled refractory shape, a plaster-graphite core is inserted into the cylindrical cavity of the mold. The fluid operable vibrating unit is started and the thixotropic mix is poured into the top of mold 84 in a conventional manner. The proper amplitude and frequency is obtained by increasing or decreasing the stiffness of tension bar 66 through the displacement of the support elements 68 toward or away from each other. Vibration of the mold and its contents continues in a vertical direction until the mold is completely filled. By vibrating the mold while it is being filled, the mix is caused to compact and to flow into intimate contact with the walls of the mold so that the final shape of the piece being cast conforms to the shape of the mold. In many operations in which a stiff mix consistency is used, it may be desirable to feed the mix through a hopper (not shown) which is attached to the vibrating frame and vibrated at the same frequency and amplitude as the mold to provide a more controlled, uniform rate of feed.

Line pressure to the vibrating unit is dependent on the total load of the mold and the tension member setting and ranges from 5 to 40 p.s.i., the average pressure being between 20 and 25 p.s.i. Frequency at this pressure is approximately 1500 vibrations per minute with an amplitude variable of from .015 to .60 inch.

As a result of this invention, an improved molding apparatus is provided for casting refractory shapes in an improved and more efficient manner. Vertical vibration transmitted to the mold tends to move the mixture in a vertical packing motion resulting in a more homogeneous body with less fine particle migration toward the mold face. Accordingly, increased density and less internal voids are obtained and subsequent nitriding of the ware is more uniform. These features are particularly critical in casting elongated, thin-walled refractory shapes.

Another advantage residing in the apparatus of this invention is that the molds are fastened securely to the vibrating frame to prevent the molds from bouncing relative to said frame, thus producing a more uniform vibration from top to bottom and reducing mold breakage. A further advantage residing in the apparatus of this invention is that during the entire period of vibration and for a predetermined time after the mold is filled, the mixture remains in the fluid state from the top to the bottom of the mold, resulting in a uniform rate of water removal. These and other advantages of this invention will be readily apparent to those skilled in the art.

A preferred embodiment of this invention having been described and illustrated, it is to be realized that modifications thereof may be made without departing from the broad spirit and scope of this invention as defined in the appended claims.

I claim:

1. A molding apparatus comprising: an elongated frame having a base at one end thereof; said frame having means for detachably securing a mold thereto; connection means for mounting said frame on at least one support member for vertical movement relative thereto, said support member comprising a pair of spaced plate members disposed on opposite sides of a portion of said frame and said connection means comprising a vertically elongated slot in said portion of said frame and a bolt extending through said plate members and said slot to provide a loose connection therebetween; means mounted on said frame for imparting vertical vibrations to said frame; means mounted on said frame for controlling horizontal vibrations induced therein; and a strike plate disposed adjacent said base of said frame and engageable therewith during vibration of said frame.

2. A molding apparatus comprising: an elongated frame having a base at one end thereof; said frame having means for detachably securing a mold thereto; connection means for mounting said frame on at least one support member for vertical movement relative thereto; means mounted on said frame for imparting vertical vibrations to said frame means mounted on said frame for controlling horizontal vibrations induced therein; a strike plate disposed adjacent said base of said frame and engageable therewith during vibration of said frame; and means on said strike plate for adjusting the vertical amplitude of said vibrations.

3. A molding apparatus as defined in claim 1 wherein said means for controlling horizontal vibrations comprises a stop member fixed between said plates adjacent said portion of said frame and means for urging said frame and thereby said portion into engagement with said stop member.

4. A molding apparatus as defined in claim 2 wherein said adjusting means comprises an elongated bar supported adjacent the opposite ends thereof on support elements, respectively.

5. A molding apparatus as defined in claim 4 including means for moving said support elements longitudinally of said tension bar.

6. A molding apparatus as defined in claim 5 wherein said support member comprises a pair of spaced plate members disposed on opposite sides of a portion of said frame.

7. A molding apparatus as defined in claim 5 wherein said connection means comprises a vertical slot in said portion of said frame and a bolt extending through said plate members and said slot to provide a loose connection therebetween.

8. A molding apparatus as claimed in claim 7 wherein said means for controlling horizontal vibrations comprises a stop member fixed between said plates adjacent said portion of said frame and means for urging said frame and thereby said portion into engagement with said stop member.

References Cited

UNITED STATES PATENTS

| 2,896,297 | 7/1959 | Goossens. |
| 2,988,340 | 6/1961 | Goossens _ _ _ _ _ _ _ _ _ _ _ _ 259—72 |
| 3,273,217 | 9/1966 | Chanlund. |

J. SPENCER OVERHOLSER, Primary Examiner

J. S. BROWN, Assistant Examiner

U.S. Cl. X.R.

259—72